June 2, 1953 S. FREEDMAN ET AL 2,640,964

MICROWAVE MODULATION

Filed May 9, 1945 3 Sheets-Sheet 1

INVENTORS
Samuel Freedman
BY Giusto Fonda Bonardi
Ralph L Chappell
ATTORNEY

INVENTORS
Samuel Freedman
BY Giusto Fonda Bonardi
Ralph L Chappell
ATTORNEY

INVENTORS
Samuel Freedman
BY Giusto Fonda Bonardi
Ralph L Chappell
ATTORNEY

Patented June 2, 1953 2,640,964

UNITED STATES PATENT OFFICE 2,640,964

MICROWAVE MODULATION

Samuel Freedman and Giusto Fonda Bonardi,
United States Navy

Application May 9, 1945, Serial No. 592,801

9 Claims. (Cl. 332—26)

This invention relates to means for producing frequency modulation in a radio-frequency apparatus, particularly one operating in the ultra-high-frequency spectrum.

An object of this invention is to modulate the frequency of an ultra-high-frequency radio transmitter in response to a modulating input signal such as, for example, one created by an audio-frequency signal.

Another object is to provide a simple apparatus for producing frequency modulation in an ultra-high-frequency system by electro-mechanical means.

Still another object is to make possible the use of frequency modulation in the microwave spectrum particularly on frequency ranges exceeding 2,000 megacycles per second.

A further object is to make possible frequency modulation without requiring electrical circuit connections to the high-frequency oscillator.

Further objects and advantages of this invention, as well as its construction, arrangement and operation, will be apparent from the following description and claims in connection with the accompanying drawings, in which, Fig. 1 is a side view, partly in section showing one form of the frequency modulation system.

As radio frequencies in the microwave spectrum (frequencies for example, over 300 megacycles) are employed, it becomes increasingly impractical to use frequency modulation by means of conventional variable reactance or phasing circuits that employ electronic means for varying the resonant frequency of an oscillating circuit.

This is due to the peculiar characteristics of tubes and circuits involving the use of coaxial cables, wave guides or cavity resonators.

This invention, instead of attempting to change either the reactance or the phasing in order to modulate the frequency, achieves such results by changing the frequency characteristics of the resonating cavity or tank circuit associated with the oscillator by mechanical or electro-mechanical control responsive to audio or any other modulations.

Figure 1:
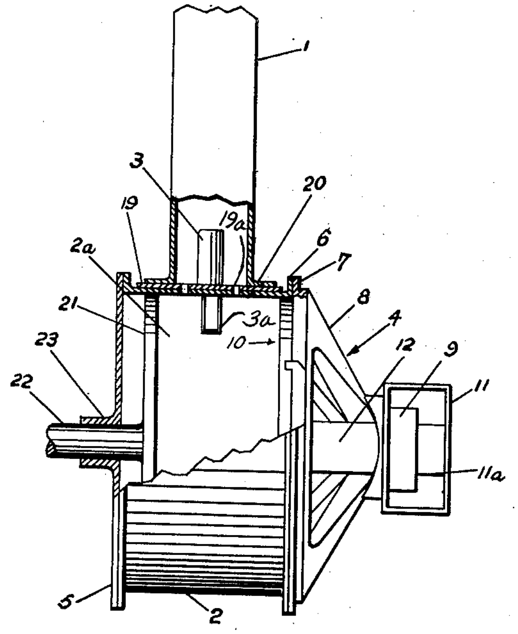
Figure 2:
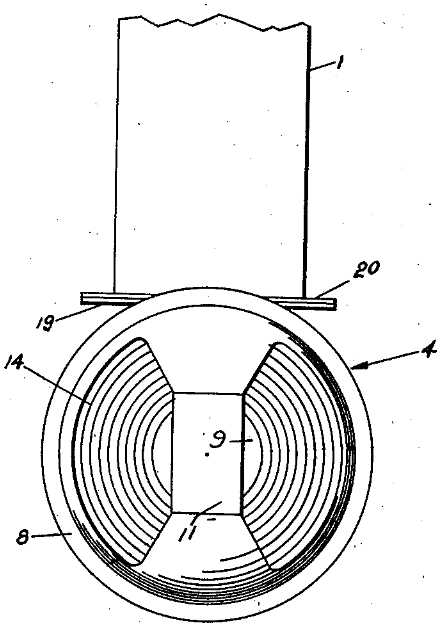
Fig. 2 is a front view of the structure of Fig. 1.

The means for producing frequency modulation according to the substance of this invention is disclosed in the drawings in which there is shown, in Figs. 1 and 2, one form of the frequency modulation apparatus.

The transmitter as shown includes a wave guide 1, a tank or resonating chamber 2, a microwave generator 3, and a modulating device generally denoted by numeral 4. The tank or resonating chamber 2 as shown is generally cylindrical in form and is closed at one end by a disk 5 to form a resonating cavity 2*a*. The other end of the tank 2 is electrically closed by the modulating device 4 which is secured thereto by means of the cooperating flanges 6 and 7.

Figure 5:
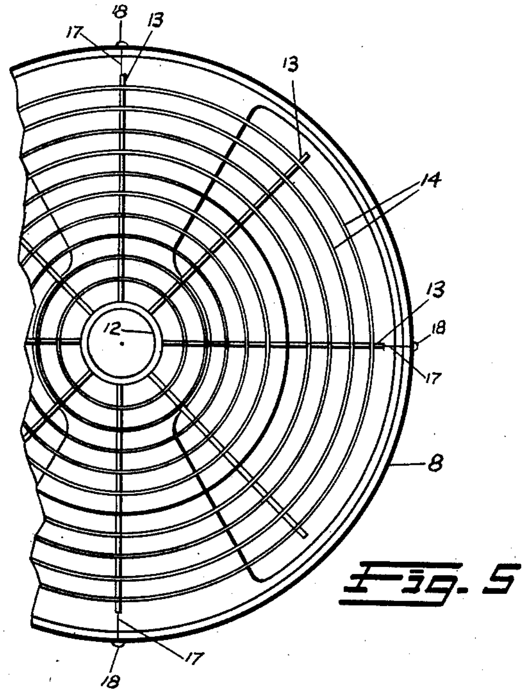
Fig. 5 is a front view of a detail of the assembly shown in Fig. 1.
Figure 6:
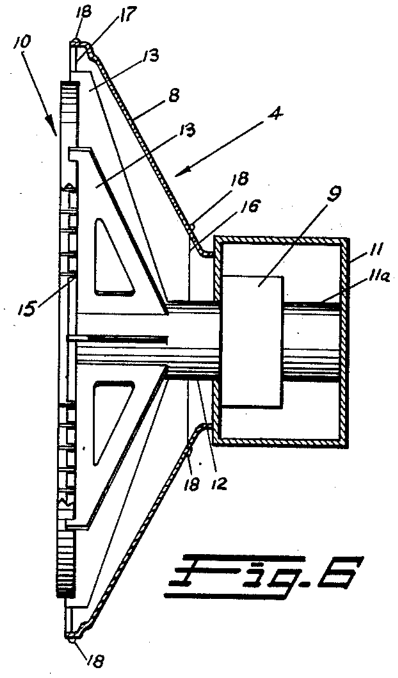
Fig. 6 is a side elevation of the detail shown in Fig. 5.
Figure 7:
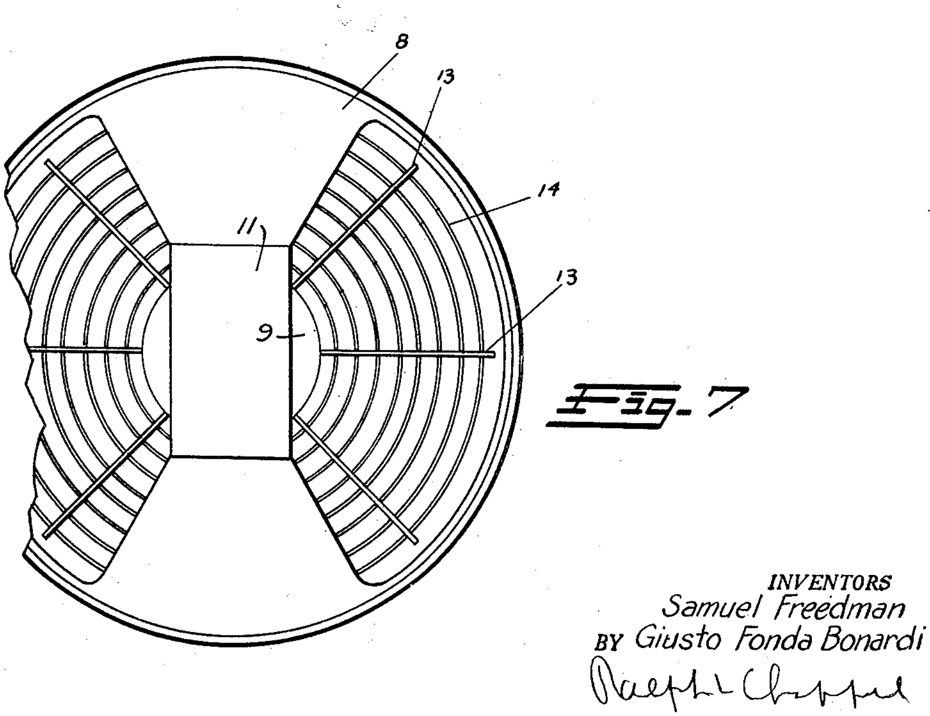
Fig. 7 is a rear elevation of the structure of Fig. 5.

The modulating device generally indicated by numeral 4 is illustrated in Figs. 5, 6, and 7 of the drawings, and consists of a generally cone shaped frame 8 in which there is mounted an electro-magnetic or electro-dynamic coil assembly 9 and a movable diaphragm or conducting shield 10. As shown in Fig. 6 the coil 9 of the modulating device is mounted in a housing 11 attached to the frame 8.

The movable or vibrating portion of the modulating device consists of the conducting shield or diaphragm 10 mounted on a support comprising the hub 12 and radially disposed arms 13. The hub 12 is made of a very light hollow material such as a fibre, paper or plastic cylinder and is secured to the coil 9 in the manner illustrated in Fig. 8. The arms 13 are secured at spaced intervals to the periphery of the hub 12 as shown in Figs. 5 and 6 so as to provide a planar seating surface for the elements comprising the diaphragm or shield 10. Both the hub 12 and the arms 13 are preferably made of a very light material such as fibre, plastic, or paper or any material possessing very low mass-inertia characteristics.

The conducting shield or diaphragm 10 consists of a number of rows of concentric conducting rings 14 embossed into the face of each of the spider arms as shown in Fig. 5. These rings are preferably made of a very light conducting material such as aluminum metallized paper, or any suitable thin light weight conducting material. The face of each arm is slotted as indicated by 15 in Fig. 6, to receive and retain the concentric rings 14 edgewise. While the rings illustrated are made of thin tape material it is obvious that wire or conductors having any desired cross section might be utilized.

The conducting shield or diaphragm is suspended from the frame 8 by a plurality of radially extending suspending threads 16 and 17 disposed peripherally around the frame 8. One end of each of these threads is secured to the spider arms 13 or hub 12 and the other end is attached to the frame 8 by means of suitable retaining washers 18. These suspending threads retain the diaphragm or conducting shield 10 spaced from the frame 8 but permit movement of the diaphragm 10 longitudinally of the frame. They also provide an elastic resistance to the movement of the coil 9 as will be later disclosed.

Figure 8:
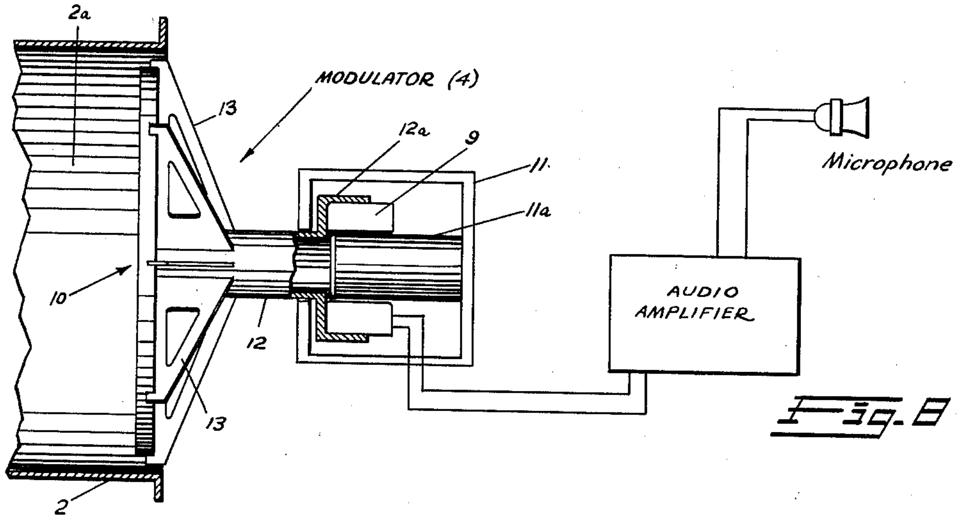
Fig. 8 is a schematic view of the modulating device and associated modulating circuit.

Further details of the modulating device are illustrated diagrammatically in Fig. 8 of the drawings. The modulating device as shown therein is similar in construction to an electrodynamic or electro-magnetic loudspeaker. The frame 11 and core 11*a* comprise a magnetic yoke, and the movable or dynamic coil 9 is mounted on the core 11*a*. The hub portion 12 of the diaphragm support is secured to such coil by the collar 12*a*.

As shown in Figs. 1 and 2 of the drawings, a support plate 19 is secured tangentially to one face of the resonator chamber 2 and a radio frequency generator designated by numeral 3 such as is disclosed, for example, in applicants' copending application Serial No. 587,544, filed on April 10, 1945, is mounted thereon. The energy generated by this transmitter is conducted into the resonating cavity 2*a* of the resonating chamber 2 and is radiated therein by the wave loops indicated by numeral 3*a* in the drawings and described in detail in the above copending application. The wave guide 1 is secured to the support plate by the flange 20 and openings 19*a* are provided between the resonating chamber 3 and the wave guide for transmission of the microwaves to the wave guides.

A tuning plate 21 in the form of a circular diaphragm as shown in Fig. 1 is slidably mounted in the resonating cavity 2*a* of the resonating chamber 2 by means of a slidable shaft 22 mounted in a bearing 23 formed in the end plate 5. Such tuning plate 21 offers means for varying the resonating characteristics of the chamber 2 within certain limits.

Figure 3:
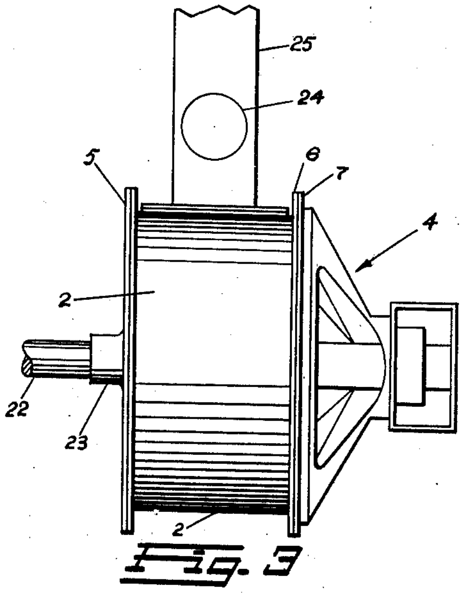
Fig. 3 is a side elevation of a modified form of frequency modulation system.
Figure 4:
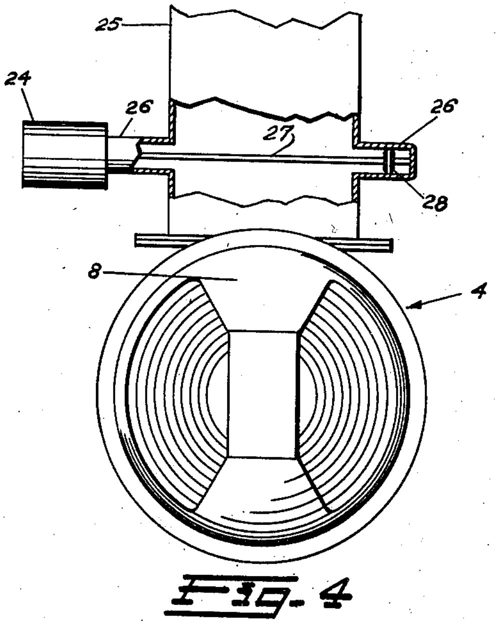
Fig. 4 is a front view of the structure shown in Fig. 3.

The modified frequency modulation transmitter illustrated in Figs. 3 and 4 of the drawings is similar to the structure above described. It includes the frequency modulating device 4, illustrated in Figs. 5, 6 and 7 as described above, and the resonating chamber 2. The microwave generator, designated in these figures as 24 is, however, contained exteriorly of the wave guide 25 in this modification and the generated energy is conducted into the wave guide 25 by the coaxial cable comprising the outer cylinder 26 secured to the wave guide 25 and the internal axial conductor 27. The latter is supported within the outer cylinder by a spacer 28. The remainder of the structure in this modification is similar to that illustrated in Figs. 1 and 2.

In the above structure, while the oscillator 3 (Fig. 1) or 24 (Fig. 4) is delivering power to the sending end of the wave guide 1 (Fig. 1) it is kept on its stated frequency by the resonating cavity 2*a* to which it is directly coupled. This cavity 2a constitutes the effective tank circuit of the oscillator, and determines the generated frequency as the wave guide 1 has no frequency of its own to offer.

As has previously been stated the invention disclosed in this case makes possible frequency modulation by varying the physical dimensions of the resonating cavity 2*a* by electro-mechanical control responsive to modulating frequencies applied to the frequency modulator 4 by an output device such as represented by way of example by the audio amplifier shown in Fig. 8.

The principle employed in this invention utilizes the general properties of hollow resonators, a condition which becomes practical at frequencies over 2,000 megacycles. It is well known that the resonating frequency of a cavity depends upon its physical size and shape. By changing any chosen dimension of such cavity it therefore becomes possible to correspondingly modify the resonating frequency of the tank circuit which forms part of this oscillator. If such change in the resonating frequency of the cavity is made to follow a definite physical law, for example, as being the function of the output of a modulating source such as, the audio amplifier illustrated schematically in Fig. 8, the frequency of the microwaves generated in the cavity 2*a* will be modulated, and frequency modulation achieved.

In the present invention the physical dimensions of the resonating chamber 2 in Fig. 1 are determined by its diameter and height. The height of the chamber 2 is made variable by the use of the modulating device 4 as one end of the resonating chamber 2. The frame 8 only of the modulating device is secured to the chamber 2 as shown in Fig. 1 and the conducting shield or movable diaphragm 10 projects freely into one end of the resonating cavity 2*a* but is not connected thereto as shown in Figs. 1 and 8. By such construction the diaphragm or shield 10 may vibrate freely within the chamber 2, the shield moving to and fro bodily as a rigid plane, with each increment of motion producing a corresponding incremental change in the cylindrical volume of the resonating cavity 2*a*. The tuning plate 21 is used as a trimmer to adjust the volume of the cavity 2*a*, and, consequently its resonating frequency to a predetermined value.

As has previously been disclosed the conducting shield 10 is secured to the electro-magnetic or electrodynamic coil 9 of the modulating device 4 much in the manner of standard loud speaker construction (see Fig. 8) and will accordingly be displaced in response to movement of such coil 9. In this case however the diaphragm structure is made very light so as to have as little mechanical inertia as possible and is freely suspended from the frame 8 only by the light flexible suspending threads 16 and 17 so as to have axial freedom of motion.

The entire diaphragm is of open construction as is apparent in Figs. 5 to 7 so that it can vibrate with minimum disturbance to the air in the cavity 2*a*, and it thus avoids audio resonance of the air volume enclosed in the resonating chamber.

The coil 9 of the modulating device 4 is electrically connected to any suitable signal source such as the output of an audio amplifier, which, in turn, receives signals from an input source such as the microphone in the manner shown in Fig. 8.

Figure 10:
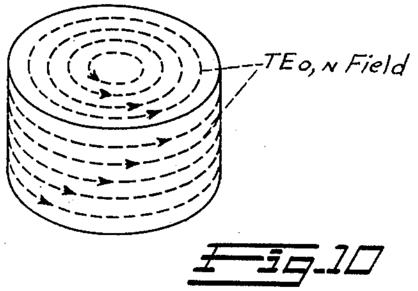
Fig. 10 illustrates the field distribution in a $TE_{0,n}$ mode of resonating cavity.

In order for the volume of the resonating cavity 2*a* to be at all times cylindrical, the conducting shield 10 (Figs. 1 and 6) moves coplanarly within the resonating cavity 2*a*. For this reason it is not secured peripherally to the frame 8 of the modulating device 4 as in ordinary loud speaker construction, but is suspended from the frame 8 in the manner shown, and above described. The conducting shield 10 therefor is not electrically connected to the main body of the resonating chamber 2. However since a $TE_{0,n}$ mode is employed, the above condition is satisfactory because in such a mode there is no current flow from the side walls to the bottom of the chamber. That is, the electric field functions in circular parallel lines on the side wall of the chamber 2 and in circular concentric lines on the ends, each independent of the other as shown in Fig. 10. For this reason the conducting shield 10 may consist of a grid structure comprising a plurality of circular closed conducting rings such as thin strips or tape material 14, as shown in Figs. 5 and 6, or wire. This insures very small weight, relatively high conductance and little appreciable air disturbance as the shield moves or vibrates in the resonating cavity 2a.

As is well known in the art, the frequency of an ultra-high-frequency oscillator is related to the characteristics of the tank circuit associated therewith. Referring to Fig. 1 of the drawings it will be seen that the resonating cavity 2a comprises the tank circuit or resonating chamber associated with the ultra-high-frequency oscillator 3, and will therefore determine the resonating frequency of the oscillator 3.

The fundamental frequency of a cylindrical resonating cavity such as the resonating chamber 2 excited in the $TE_{0,n}$ mode can be expressed by the equation:

$$f=a\sqrt{\frac{b}{r^2}+\frac{1}{z^2}} \quad (1)$$

where $f$=frequency in cycles per second
$r$=radius of the chamber in meter
$z$=length of height of the chamber in meters
$a$, $b$=constants Differentiating Equation 1 with respect to $z$, $r$ and $b$ being constant.

$$df=\frac{-adz}{z^2\sqrt{b\left(\frac{z}{r}\right)^2+1}} \quad (2)$$

and $$\frac{df}{f}=\frac{-dz}{z^3\left(\frac{b}{r^2}+\frac{1}{z^2}\right)} \quad (3)$$

which can be simplified to $$\frac{df}{f}=\frac{-dz}{z\left[b\left(\frac{z}{r}\right)^2+1\right.} \quad (4)$$

Equation 4 shows that the same frequency deviation will be produced by a smaller $z$ and a smaller incremental displacement $dz$ in the direction of $z$. This results in good linearity of response as the conducting shield 10 vibrates in response to modulating signals received from the amplifier (Fig. 8).

The modulating device 4 is similar to conventional loudspeaker construction insofar as the moving coil 9 is concerned. The voltage across such a coil can be expressed by $$V=i\omega Lj-\frac{d\phi}{dt}+Rj \quad (5)$$

where:

V is the voltage across the coil
$\omega$ is 2 times the frequency in cycles per second L is the self-inductance of the coil
R is the coil resistance
$\phi$ is the magnetic flux cut by the coil when displaced
$j$ is the current in the coil
$i$ is a vector notation to indicate a component of voltage at right angles to the in phase component.

Since the flux is related to the magnetic field strength and the physical dimensions of the coil, then $$d\phi=B2\pi rndz \quad (6)$$

where:

B is the flux density due to the magnetic field in which the coil is mounted
$r$ is the radius of the coil
$n$ is the number of turns in the coil
$dz$ is the incremental displacement of the coil
$\phi$ is the total flux due to the current in the coil.

If the instantaneous velocity of the coil is represented by "$v$" then $$dz=vdt \quad (7)$$

Substituting (6) and (7) in (5) there results $$V=i\omega Lj-2\pi rnBv+Rj \quad (8)$$

The velocity, $v$, of the coil is the integral of its acceleration with respect to time, $t$. The acceleration in turn is equal to $$\frac{F}{M}$$

where F is the force acting on the coil, and M is the mass of the coil. The force is equal to $2\pi rnBj$ or $$\int\frac{F}{M}=\int\frac{2\pi rnBj}{M}$$

which when integrated becomes $$v=\frac{2\pi rnB}{M}\int jdt \quad (9)$$

For a varying current $$j=j_0e^{-\omega t};\ dj=-\omega(j_0e^{-\omega t})dt$$

or $$dj=-\omega jdt \text{ and } j=\frac{-dj}{\omega dt}$$

substituting such value of J in (9) and integrating $$v=-\frac{2\pi}{\omega}rn\frac{B}{M}j$$

which can be denoted vectorially by using the operator $i$ as $$v=-i\frac{2\pi}{\omega}rn\frac{B}{M}j \quad (10)$$

Substituting this value of $v$ in (8) there results $$V=i\omega Lj+\frac{i4\pi^2r^2n^2B^2j}{M}+Rj \quad (11)$$

and since the impedance $$z=\frac{V}{j}$$

then the compound or absolute impedance of the moving parts of the frequency modulator including the coil 9, the conducting shield 10 and related structure is $$Z=i\left(\omega L+\frac{4\pi^2}{\omega}r^2n^2\frac{B^2}{M}\right)+R \quad (12)$$

Combining Equations 10 and 7 and again expressing $j$ as equal to $$\frac{-dj}{\omega dt}$$

then $$dz=-\frac{2\pi}{\omega}rn\frac{B}{M}jdt$$

$$Dz=-\frac{2\pi}{\omega}rn\frac{B}{M}\int\frac{-dj}{\omega dt}dt$$

and integrating between assumed limits 2 and 1

$$Dz=-\frac{2\pi}{\omega}rn\frac{B}{M}(j_2-j_1) \quad (13)$$

Figure 9:
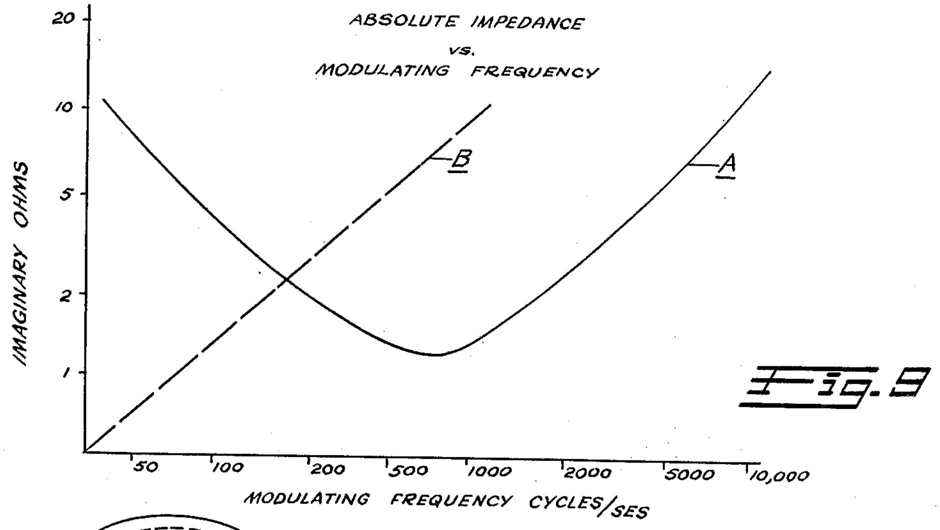
Fig. 9 is a curve showing the impedance-frequency relationship of the modulating device.

Equation 12 expresses the compound or absolute impedance of the moving parts of the modulating device, that is, the sum of the impedance of the coil 9, the mechanical impedance of the support 12, and the conducting shield 10. Assuming a modulation device in which the mass of the moving parts is 10 grams, a curve showing the relation of the absolute impedance versus modulating frequency can be plotted as in Fig. 9.

In this figure curve A shows the absolute impedance of a modulating device having both mechanical and electrical impedance such as the modulating device 4 of Fig. 11 while curve B illustrates a signal responsive device in which the reactance varies as the electrical impedance alone. Impedance matching for a device represented by curve A is feasible over a wider range of modulatory frequencies than for a device reacting according to curve B.

It thus becomes clear that the total impedance of the modulating device can be changed by varying the impedance due to the inertia offered by the mass of the moving parts of the modulating device. By properly choosing the mass of the moving parts as well as the inductance and resistance of the electrical portions of the modulating device, impedance matching of the modulating device with the modulating signal source, such as the amplifier shown in Fig. 8, can be obtained.

Equation 13 determines the characteristics of the modulating signal source, such as the amplifier shown in Fig. 8 to be used with the frequency modulator 4 of Fig. 1.

Since $$Dz=\frac{2\pi}{\omega^2}rn\frac{B}{M}(j_2-j_1)$$

the displacement of the coil 9 and related movable members of the modulating device 4 varies inversely as the square of the frequency. When using a modulating device incorporating the features of a loudspeaker, such as the modulator 4 shown in Fig. 1, the amplitude of vibration of the diaphragm 10 (Fig. 1) should be proportional to the current supplied and independent of the frequency of the current. The modulating signal source therefore must be of such design that the current ($j$) must be proportional to the square of the frequency in order for the response to be linear as shown by the above equation.

The frequency modulating system above disclosed may be adapted for automatic frequency control. In frequency modulation the carrier value of the frequency is proportional to the average position of the moving coil 9 of the modulating device 4 while the "deviation frequency" is proportional to the modulating signal such as the audio signal from the amplifier (Fig. 8). Thus, automatic frequency control becomes possible in this system if the average position of the moving coil is maintained constant by any suitable means able to detect changes in the carrier value of the frequency or the average position of the coil. Such detecting means, by feeding through a suitable capacitance-resistance network, may be used to control the average current through the coil of the modulating device. The force on the coil resulting from such current flow is balanced by the elastic resistance offered by the suspending threads (16 and 17 in Fig. 6) in such a manner as to neutralize any small change in the average position of the coil. The details of the automatic frequency control means are disclosed in a companion application subsequently to be filed and are not further discussed in this case.

The various features of the frequency modulation system comprising this invention are summarized below.

The invention makes possible the use of frequency modulation principles without dependence upon variable reactance or phase circuits.

The frequency modulation system disclosed functions by simple and obvious electro-mechanical methods. The invention facilitates and simplifies the use of frequency modulation in the microwave spectrum particularly on frequencies exceeding 2,000 megacycles.

Frequency modulation by this method may be employed on any frequency so long as the dimensions of the resonating cavity employed are feasible.

No electric circuit connection with the high frequency circuit components are required in this system.

No ratio relationship need exist between the microphone input power and the transmitting output power so long as the electro-mechanical modulating device disclosed can vibrate in the resonating cavity in accordance with the desired modulations.

The circuit voltages need not be held to critical values because of the impressed modulation upon the carrier.

There is no power dissipation in the high frequency apparatus nor variation because of the modulation.

Modulation is possible by any electrical, mechanical or electro-mechanical influence or action which physically changes the dimensions of the cavity. Thus, in addition to the vibrating diaphragm and voice coil of a loudspeaker as disclosed, any medium which undergoes a dimensional change in response to an impressed signal will function to produce frequency modulation in this system.

The deviation frequency can be kept percentually low in the system disclosed with respect to the carrier frequency in order to provide a maximum number of communication channels by holding the amount of audio power applied to the modulating device 4 to a minimum.

Similarly, the frequency deviation can be made percentually large with respect to the carrier frequency to provide maximum fidelity and freedom from interference by applying more audio power to the modulating device 4, within the limits of linearity of the modulator.

Frequency stability is possible by providing proper control of the physical dimensions of the resonating chamber 2 by means of an automatic frequency control circuit.

Linearity of response is obtained by proper control of the physical dimensions of the resonating chamber by making the dimensional changes of the cavity vary with the modulating input as has been previously disclosed.

The frequency modulation system disclosed makes possible the transmission of other than audio signals, since any signal which will actuate the moving coil or conducting shield of the modulating device 4 will cause the system to function.

While the above disclosure relates to a frequency modulation system in which the cylindrical volume of a resonating cavity is made to vary in accordance with impressed modulating systems, it is obvious that a resonating chamber having any other geometrical configuration could be used using the principles disclosed.

It is to be understood that various modifications and changes may be made in this invention without departing from the spirit and scope thereof as set forth in the appended claims.

What is claimed is:

1. A frequency modulating system for ultra-high-frequency wave energy comprising in combination, a high-frequency oscillator, a wave guide output circuit including means enclosing said oscillator therewithin, a resonating chamber coupled to said oscillator and connected to said wave guide, an adjustable tuning shield in said resonating chamber, a movable conducting shield in said resonating chamber, and means actuating said movable conducting shield in response to an applied modulating signal.

2. A frequency modulating system for ultra-high-frequency systems, comprising a wave guide, a cavity resonator coupled to said wave guide, a high-frequency oscillator mounted in the wave guide and coupled to said cavity resonator, said resonating cavity forming a tank circuit for said oscillator, a modulating device comprising a conducting shield and a signal responsive means forming a surface of said resonating cavity, whereby modulating signals applied to said modulating device will modulate the characteristics of said tank circuit.

3. In combination with an ultra-high-frequency oscillator and resonating chamber, a modulating device comprising a conducting shield forming a surface of said resonating chamber, a supporting hub made of low inertia material for said conducting shield, and electrodynamic signal responsive means connected to said supporting hub, said conducting shield consisting of a plurality of rings of concentric spaced conductors of low inertia material arranged coplanarly on an open latticed base plate made of low inertia material whereby said conducting shield will respond to an applied signal with a maximum displacement and a minimum disturbance of the air within said resonating chamber.

4. Ultra-high-frequency apparatus comprising means defining a cavity resonator adapted to sustain electromagnetic oscillations therein and including a movable wall portion for adjusting the normal operating frequency thereof, movable means within said resonator for altering the operating frequency thereof, said last-named means comprising an array of spaced conductive elements, and means mounting said array for oscillatory movement at audio-frequency values, thereby to effect frequency modulation of the oscillations.

5. The apparatus as defined in claim 4 wherein said conductive elements are circular filaments concentrically arranged in circular forms, the radii of the circular forms being selected with respect to the cross-section of the individual filaments so that the space between adjacent filaments is large compared to the cross-section of said filaments.

6. Ultra-high-frequency apparatus comprising means defining a cavity resonator adapted to set up and maintain high-frequency electromagnetic oscillations therein, movable means within said resonator for altering the normal frequency of operation of said resonator, said movable means comprising a plurality of spaced conductive elements disposed in concentric array, means mounting said array for oscillatory movement, and means for actuating said array in accordance with a modulation signal, whereby the high-frequency oscillations are modulated accordingly.

7. Ultra-high-frequency apparatus comprising means defining a cavity resonator adapted to set up and maintain ultra-high-frequency electrical oscillations therein, movable grid means within said resonator for altering the normal operating frequency thereof, said grid means comprising a plurality of circular conductors disposed in spaced concentric array, and means mounting said grid means for oscillatory movement in accordance with a desired modulation frequency.

8. Ultra-high-frequency apparatus comprising means defining a cavity resonator adapted to set up and maintain ultra-high-frequency electrical oscillations therein, movable grid means within said resonator for altering the normal operating frequency thereof, and means mounting said grid means for oscillatory movement in accordance with a desired modulation frequency, said grid mounting means comprising a spider having a plurality of radially extending ribs, predetermined edges of said ribs being coplanarly disposed to define a plane surface, said predetermined edges being grooved to receive said grid means therein.

9. Ultra-high-frequency apparatus comprising means defining a cavity resonator adapted to set up and maintain ultra-high-frequency electrical oscillations therein, movable grid means within said resonator for altering the normal operating frequency thereof, and means mounting said grid means for oscillatory movement in accordance with a desired modulation frequency, said mounting means comprising a plurality of resilient filamentary suspensory elements quadrantally disposed with respect to said grid means.

SAMUEL FREEDMAN.
GIUSTO FONDA BONARDI.

References Cited in the file of this patent

UNITED STATES PATENTS

| Number | Name | Date |
|---|---|---|
| 1,615,645 | Nyman | Jan. 25, 1925 |
| 1,972,964 | Wolcott, Jr. | Sept. 11, 1934 |
| 2,108,640 | Bieling | Feb. 15, 1938 |
| 2,217,280 | Koch | Oct. 8, 1940 |
| 2,218,223 | Usselman et al. | Oct. 15, 1940 |
| 2,294,942 | Varian et al. | Sept. 8, 1942 |
| 2,312,919 | Litton | Mar. 2, 1943 |
| 2,438,832 | Turner | Mar. 30, 1948 |
| 2,444,435 | Fisk | July 6, 1948 |
| 2,461,005 | Southworth | Feb. 8, 1949 |